United States Patent [19]
Fukunaga

[11] Patent Number: 5,720,704
[45] Date of Patent: Feb. 24, 1998

[54] ROLL FOR A DRY ELECTROSTATIC DEVELOPER

[76] Inventor: Noritomo Fukunaga, c/o Kinyosha Co., Ltd., 3-24, Ohsaki 1-chome, Shinagawa-ku, Tokyo 141, Japan

[21] Appl. No.: 690,079

[22] Filed: Jul. 31, 1996

[51] Int. Cl.$^6$ ........................................ B32B 15/06
[52] U.S. Cl. ........................ 492/59; 492/56; 428/36.8
[58] Field of Search ................ 492/56, 59; 428/36.8, 428/36.91, 36.92

[56] References Cited

U.S. PATENT DOCUMENTS

| | | | |
|---|---|---|---|
| 4,700,450 | 10/1987 | Michel | 492/56 |
| 4,844,953 | 7/1989 | Keto et al. | 492/56 |
| 5,153,660 | 10/1992 | Goto | 492/56 |
| 5,401,570 | 3/1995 | Hechs et al. | 492/56 |

*Primary Examiner*—Irene Cuda
*Attorney, Agent, or Firm*—Sherman and Shalloway

[57] ABSTRACT

A roll having a rigid core and a non-adherent coating layer, wherein the non-adherent coating layer is obtained by obtaining a silane-modified fluororubber according to a radical addition reaction between a fluororubber (peroxide crosslinked fluororubber) including iodine and/or bromine and a silane compound having a group containing a radical reactive unsaturated bond and a hydrolytic group and then crosslinking the silane-modified fluororubber according to hydrolytic polycondensation.

5 Claims, No Drawings

ROLL FOR A DRY ELECTROSTATIC DEVELOPER

FIELD OF INDUSTRIAL UTILIZATION

The present invention relates to a roll having a rigid core and a non-adherent coating layer, and, in particular, to a roll which exhibits an excellent performance as a hot-pressing fixing roll of a dry electrostatic duplicator and a laser printer.

Conventionally, a hot-pressing roll having a metal core and a non-adherent coating layer has been employed generally in a fixing system of a dry electrostatic duplicator and a laser printer. As materials for the non-adherent coating layer of the hot-pressing roll are proposed a fluorine resin (U.S. Pat. No. 3,268,351), a dimethyl silicone rubber (U.S. Pat. No. 3,666,247, Japanese Laid-Open Patent Publication No. 52-46819), a phenyl silicone rubber (Japanese Laid-Open Patent Publication No. 59-209129), a fluorosilicone rubber (Japanese Laid-Open Patent Publication No. 3-26947) and a fluororubber (Japanese Laid-Open Patent Publication No. 55-135876), and some of them are employed for practical use.

However, these materials do not have sufficient non-adherence to a toner for dry development, and therefore, a so-called oil-feed method has to be employed, by which a silicone oil is always supplied onto the surface of a roll.

A fluorine resin coating generally exhibits excellent non-adherence, but since wetting with a silicone oil is poor and it has a hard surface and lacks rubber elasticity, it has a defect of giving unnecessary gloss to the copied surface. A dimethyl silicone coating absorbs a silicone oil when heated and expands, and may be destroyed in some cases. With respect to a phenyl silicone rubber coating, though silicone oil resistance is improved there is a problem on non-adherence to a toner. A fluorosilicone rubber coating has sufficient silicone oil resistance, but it is poor in heat resistance and physical strength, and its maximum service temperature is about 180° C., and, hence, it cannot sustain a temperature of 230° C., the surface temperature of a fixing roll required for a high-speed duplicator of today. A fluororubber coating can sustain a service temperature of 270° C. and is not invaded with a hot silicone oil at all, but it is poor in non-adherence and needs the supply of a large amount of a silicone oil.

Hence, a method of incorporating and dispersing a modified silicone oil in a fluororubber (Japanese Laid-Open Patent Publication No. 3-285934) and a method of treating a fluororubber roll with a modified silicone oil after molding it (Japanese Laid-Open Patent Publication No. 6-175532) have been proposed with a view to improving affinity between a fluororubber and a silicone oil; however, products according to these methods employ an amino-modified silicone oil, a mercapto-modified silicone oil and a carboxyl-modified silicone oil with poor heat resistance and easily cause heat deterioration at a temperature around 230° C., and hence the affinity of a roll with a silicone oil disappears rapidly. Besides, blending of a fluororubber and a silicone rubber has been attempted, which has a fault in processability; blending of a fluororubber and a copolymer type of a silicone rubber seems to be investigated, which cannot obtain great effects.

Problems for the Invention to Solve

Accordingly, the object of the present invention is to provide a fixing roll having a high affinity with a silicone oil, being excellent in release properties with a toner and low in static properties, and having a non-adherent coating layer with heat resistance and durability.

Means for Solving the Problems

According to the present invention, a roll having a rigid core and a non-adherent coating layer, exhibiting prominent performance as a hot-pressing fixing roll of an electrostatic duplicator free from the above-mentioned defects of prior arts can be obtained by obtaining the non-adherent coating layer by obtaining a silane-modified fluororubber according to a radical addition reaction between a fluororubber (peroxide crosslinked type) comprising iodine and/or bromine and a silane compound having a group containing a radical reactive unsaturated bond and a hydrolytic group and then crosslinking the silane-modified fluororubber according to hydrolytic polycondensation.

Hereunder, the present invention will be described in more detail.

A fluororubber comprising iodine and/or bromine at a molecular chain terminal or a side chain to be used in the present invention is known as a peroxide crosslinked fluororubber, which is heat-cured by using an organic peroxide crosslinking agent generally in the presence of a crosslinking auxiliary like triallyl isocyanurate (see U.S. Pat. Nos. 4,035,565, 4,214,060, 42,433, 770). In an embodiment of the present invention can be used optional peroxide crosslinked fluororubbers, for example, Daiel™ G-901, G-902 and G-801 (Daikin Kogyo), Baiton™ GF and GLT (Showa Denko KK Du Pont); those of a vinylidene fluoride-hexafluororopyrene-ethylene tetrafluoride three-dimensional copolymer system and those of a vinylidene fluoride-hexafluororopyrene two-dimensional copolymer system are preferable.

As a silane compound having a group containing a radical reactive unsaturated bond and a hydrolytic group to be used in the present invention can be mentioned compounds represented by the general formula $YSiR_{3-n}X_n$ (wherein Y denotes a group containing a radical reactive unsaturated bond such as a vinyl group, a methacryloxy group, an allyl group and a styrene group, R denotes an inert group such as a methyl group and a phenyl group, X denotes a hydrolysis group, generally an alkoxyl group such as a methoxyl group and an ethoxyl group, and n denotes 1, 2 or 3). X may be, in addition, a methyl-ethyl-ketoxime group (deoxime reaction), an acetoxyl group (deacetic acid reaction), an isoropenyloxy group (deacetone reaction), an amino group (deamine reaction) and an amide group (amide reaction).

The following compounds are on the market and easily available:

$CH_2=Si(OC_2H_5)_3$ A-151, $CH_2=CHSi(OCH)_3$ A-171, $C_2=CHSi(OC_2H_4OCH_3)_3$ A-172, $CH_2=CCH_3SiCOOC_3H_6Si(OCH_3)$ A-174 (manufactured by Nihon Unicar); $CH_2=CCH_3CO(CH_2)_3SiCH_3(OCH_3)_2$ AY-43-060, $(CH_2=CHCH_2)_2N(CH_2)_3Si(OCH_3)_3$ (manufactured by Toray Silicone).

Hereunder, an embodiment of a reaction processing for obtaining a silane-modified fluororubber according to a radical addition reaction of a fluororubber (peroxide crosslinked type) comprising iodine and/or bromine and a silane compound having a group containing a radical reactive unsaturated bond and a hydrolytic group is shown in the formula (1):

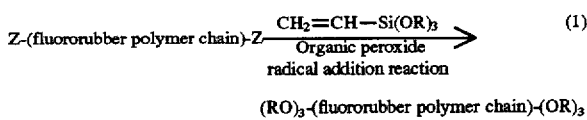

In the above reaction, as an organic peroxide can be used organic peroxides to be used ordinarily for the vulcanization of a peroxide crosslinked flurororubber, for example, 2,5-dimethyl-2,5-di-t-butylperoxyhexane.

It is desirable that the reaction is performed by heating compounds at a temperature of from about 150° to 160° C. In an atmosphere of an inert gas or in a sealed system for from 15 to 20 minutes.

A radical addition reaction may be performed by the irradiation of ionizing radioactive rays such as ultraviolet rays and electron rays.

The thus obtained silane-modified fluororubber is dissolved in a proper solvent and applied onto a rigid core, and it is left to stand at room temperature; then is is cured according to hydrolytic polycondensation caused by the action of water content added into the solution or moisture in air.

It is thought that the formation of three-dimensional crosslinking due to hydrolytic polycondensation is performed in the manner shown in the following formula (2):

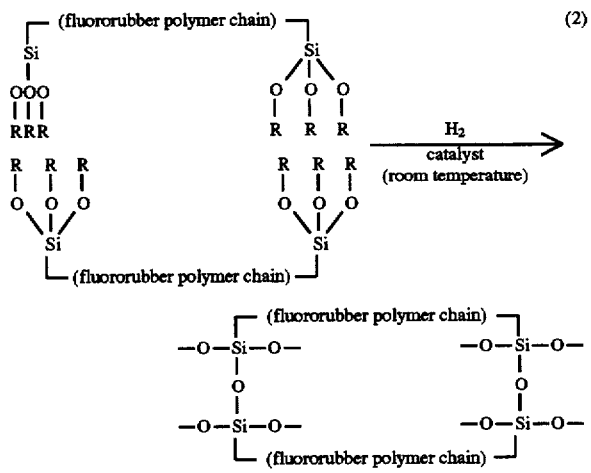

Generally, a catalyst is used in order to accelerate hydrolytic polycondensation. Examples of a catalyst include acids such as acetic acid, bases such as triethanolamine and n-butylamine, organic acid salts of zinc, tin, cobalt and iron such as lead octanoate and dibutyltin dilaurate.

Various characteristics of a roll according to the present invention can be further improved by incorporating substances exemplified below as a co-crosslinking agent. The term of a "co-crosslinking agent" in the specification means a compound capable of being incorporated in the hydrolytic polycondensation of a silane-modified fluororubber, and hence monofunctional compounds like $(CH_3)_3SiOCH_3$ can be included.

1) Improvement of Affinity with a Silicone Oil
1-1) Compounds Having a Methyl Siloxane Group together with a Hydrolytic Group
$CH_3Si(OCH_3)_3$ TSL-8113, $(CH_3)_2Si(OCH_3)_2$ TSL-8112, $(CH_3)_3SiOCH_3$ TSL-8111 (manufactured by Toray Silicone); $(C_3)_3SiO$ LS-310 (manufactured by Shinetsu Kagaku Kogyo); $(CH_3)_2CCH_2Si(OCH_3)_3$ AY-43-048, $(CH_3O)Si(CH_2)_6SI(OCH_3)_3$ AY-43-083 (manufactured by Toray Silicone)

1-2) Modified Silicone Oils
SiH-group-containing silicone oils L-31, FZ-3805, FZ-3702 (manufactured by Nihon Unicar); SiOH-group-containing silicone oils FZ-3122, L-9000; SiO (alkyl)-group-containing silicone oils FZ-3701, FZ-3704 (manufactured by Nihon Unicar)

1-3) Room-Temperature-Cured Silicone Rubbers deacetic acid type KE42 RTV, deoxime type KE45 RTV, deacetone type KE347 RTV, dealcohol type KE4895 (manufactured by Shinetsu Kagaku Kogyo); deamide type BA-10 (manufactured by Bayer)

2) Improvement of Release Properties with a Toner Fluroalkyl-Group-Containing Compounds
$CF_3(CH_2)_2Si(OCH_3)_3$ XC-95-418, $CF_3(CF_2)_5(CH_2)_2Si(OCH_3)_3$ XC-95-468, $CF_3(CF_2)_7(CH_2)_2Si(OCH_3)_3$ XC-95-470, $CF_3(CF_2)_7(CH_2)_2SiCH_3(OCH_3)_2$ XC-95-472 (manufactured by Toshiba Silicone); $C_8F_{17}SO_2NPr(CH_2)_3Si(OCH_3)_3$ MF-160 (manufactured by Mitsubishi Material)

3) Control of Static Properties Polyether-Group-Containing Compounds MAC-2301 (manufactured by Nihon Unicar)

Various characteristics of a roll according to the present invention can be further modified by incorporating common compounding agents for fluororubbers exemplified below:

Fillers for improving physical characteristics of rubbers: MT black, FT black, powder silica, powder quarts.

Electroconductivity-imparting agents: Ketchen black (Ketchen-EC), acetylene black, carbon fiber, conductive ceramics, whisker, metal powder, conductive metal coating powder.

Dielectric characteristics adjusting agents: high-dielectric ceramics (barium titanate, Strontium), organic high-dielectric substances.

Thermal conductivity adjusting agents: metal powder, ceramics powder, metal oxides.

Heat resistance improvers: metal oxides and hydroxides of MgO, PbO, $Ca(OH)_2$ and the like.

Antistatic agents: surface active agents.

Abrasion resistance improvers: mica powder.

Processability-imparting agents: low-molecular liquid fluororubber (Daiel G-101; Daikin Kagaku Kogyo), fluoro-silicone oil, fluorosilicone rubber, perfluoroalkylvinyl-ether-containing fluorine oil (Demnum™; Daikin Kogyo)

Compatibilizing agents: silicone rubber, silicone oil, modified silicone oil, silicone resin, silicone varnish, silicone rubber powder.

Others: polytetrafluoroethylene resin, PFA (tetrafluoroethylene-perfluorovinyl ether copolymer) resin, FEP (tetrafluoroethylene-hexaflurororopyren copolymer) resin, low-molecular polytetrafluroethylene resin, oligo-tetrafluoroethylene, reactive perfluoroalkylating agents and perfluoroaklyl compounds, fluoroether compounds, fluoro-alkylvinyl ether compounds, fluorocarbon surface active agents.

The amounts of a co-crosslinking agent, water and a catalyst to be incorporated on the curing of a silane-modified fluororubber at room temperature are not particularly restricted.

A silane-modified fluororubber is generally postcured, after being cured at room temperature, at a high temperature in an atmosphere of an inert gas or under vacuum, and the conditions are not particularly restricted.

A roll according to the present invention can have a monolayer structure having only a postcured silane-modified fluororubber layer as a non-adherent coating layer, and besides can have a multi-layer structure having an intermediate layer comprising a heat-resistant rubber. As a heat-resistant rubber can be used EPT, acryl rubbers, silicone rubbers and flurorosilicone rubbers. An intermediate layer may be a sponge-like one.

As those skilled in the art understand easily, a silane-modified fluororubber according to the present invention can be used as a non-adherent belt by being applied onto a belt-like metal sheet, a rubber sheet and cloth and postcured.

Hereunder, the present invention will be describe in more detail according to Examples and Comparative Example.

Comparative Example

To 100 weight parts of a fluororubber (Daiel G-801, manufactured by Daikin Kagaku Kogyo) were added 20 weight parts of MT carbon black, 4.0 weight parts of triallyl isocyanurate (Taic, manufactured by Nihon Kasei) and 1.5 weight parts of a peroxide (Perhexa 2 5B, manufactured by Nihon Yushi), and the mixture was kneaded sufficiently with a two-roll rubber mill and dissolved into a mixed solvent of MEK/MBK of 1:1 to make a solution with the solid content of 33 weight %.

Separately, an aluminum (core metal) core with a diameter of 59.0 mm was washed with 1,1,1-trichloroethane and the surface thereof was coated with a silicone-based primer; a heat-cured silicone rubber tape with JIS hardness of 60° was wound thereon and heat-pressed in a mold to produce a silcone rubber roll with a diameter of 62.0 mm. The surface of the roll was ground to have a diameter of 60.0 mm, and coated with a Chemrock™ 606 (manufactured by Hughson Chemicals) primer and air-dried for 2 hours.

Subsequently, the silicone rubber roll was spray-coated with a non-silane-modified fluororubber solution prepared in the above manner; after the solvent was volatilized, a heat-curing treatment was performed in an atmosphere of nitrogen gas at 180° C. for 30 minutes and dried to form a coating with a thickness of 30 um and obtain a comparative roll.

EXAMPLE 1

One hundred weight parts of a fluororubber (Daiel G-801, manufactured by Daikin Kagaku Kogyo), 3 weight parts of a silane coupling agent (A-174, manufactured by Nihon Unicar), 1.5 weight parts of a peroxide (Perhexa 2 5B) and 20 weight parts of MT-carbon black were kneaded with a two-roll rubber mill sufficiently; the mixture was then heat-pressed at 155° C. for 20 minutes, cooled and taken out of a press mold to produce a silane-modified fluororubber. The modified rubber was dissolved into a mixed solvent of MEK/MIBK of 1:1 dehydrated in advance to make a solution with the solid content of 33 weight %.

Separately, to 100 weight parts of MIBK were added 7 weight parts of dibutyltin dilaurate and 2 weight parts of distilled water to prepare a catalyst-and-water-containing liquid.

To 100 weight parts of the above silane-modified fluororubber solution with the solid content of 33 weight % were added 10 weight parts of the catalyst-and-water-containing liquid and the mixture was stirred sufficiently; a silicone rubber roll was spray-coated with the obtained mixed liquid in the same procedure as in Comparative Example and left to stand at room temperature for 3 days, and then postcured at 200° C. for 4 hours to produce a roll according to the present invention.

EXAMPLE 2

A roll according to the present invention was produced in the same procedure as in Example 1 except that the following co-crosslinking agents were added into the mixed liquid of the silane-modified fluororubber solution and the catalyst-and-water-containing liquid.

| | Co-crosslinking agents | | Amount added (weight parts) |
|---|---|---|---|
| 2-1 | TSL-8112 | (manufactured by Toray Silicone) | 8 |
| | | | 4 |
| 2-2 | TSL-8112 | (manufactured by Toshiba Silicone) | 6 |
| | XC-95-470 | | 4 |
| 2-3 | TSL-8112 | (manufactured by | 4 |

-continued

| | Co-crosslinking agents | | Amount added (weight parts) |
|---|---|---|---|
| | MAC-2301 | Nihon Unicar) | |
| 2-4 | TSL-8112 | | 3.0 |
| | XC-95-470 | | 4.5 |
| | MAC-2301 | | 3.0 |

Comparative Test

The rolls produced in Comparative Example and Example 1 and Example 2 (2-1, 2-2, 2-3 and 2-4) were fitted as hot-pressing fixing rolls to a dry electrostatic duplicator of A-4 letting-in crosswise 50 sheets/min. (NP-7550, manufactured by Canon), the hot-pressing fixing roll of which is always coated with a silicone oil; the degree of stain by a toner on the surface of each roll was observed according to a machine-running test and the final endurance life (number of copies) was evaluated.

The results are shown in the table below:

| Example No. | Final endurance life (copies) |
|---|---|
| Comparative Example | 16,500 |
| Example 1 | 131,000 |
| Example 2 | |
| 2-1 | 207,000 |
| 2-2 | 214,000 |
| 2-3 | 203,000 |
| 2-4 | 225,000 |

It is apparent according to the above results that the use of a silane-modified fluororubber obtained by a radical addition reaction between a fluororubber (peroxide crosslinked fluororubber) comprising iodine and/or bromine and a silane compound having a group containing a radical reactive unsaturated bond and a hydrolytic group is important and that the combination thereof with a co-crosslinking agent compound containing a fluoroalkyl group, a methylsiloxane group or a polyether group is more preferable.

Effects of the Invention

A hot-pressing fixing roll according to the present invention has a long life and a high affinity with silicone oils, and can be produced easily without employing particular working conditions and particular materials hard to obtain.

What is claimed is:

1. A roll having a rigid core and a non-adherent coating layer, wherein said non-adherent coating layer is obtained by obtaining a silane-modified fluororubber according to a radical addition reaction between a fluororubber (peroxide crosslinked fluororubber) comprising iodine and/or bromine and a silane compound having a group containing a radical reactive unsaturated bond and a hydrolytic group and then crosslinking the silane-modified fluororubber according to hydrolytic polycondensation.

2. A roll as claimed in claim 1, wherein crosslinking is performed at room temperature.

3. A roll as claimed in claim 1 or 2, wherein crosslinking is performed in the co-existence of a hydrolytic silane compound having a fluoroalkyl group, a methylsiloxane group and/or a polyether group as a co-crosslinking agent.

4. A roll as claimed in claim 1, which is a hot-pressing fixing roll of a fixing device of a dry electrostatic duplicator.

5. A roll as claimed in claim 1, which is a back-up roll of a fixing device of a dry electrostatic duplicator.

* * * * *